Jan. 31, 1950 R. W. SMITH 2,496,136
UNDERCARRIAGE FOR SELF-LAYING TRACK TYPE VEHICLES
Filed Jan. 2, 1948
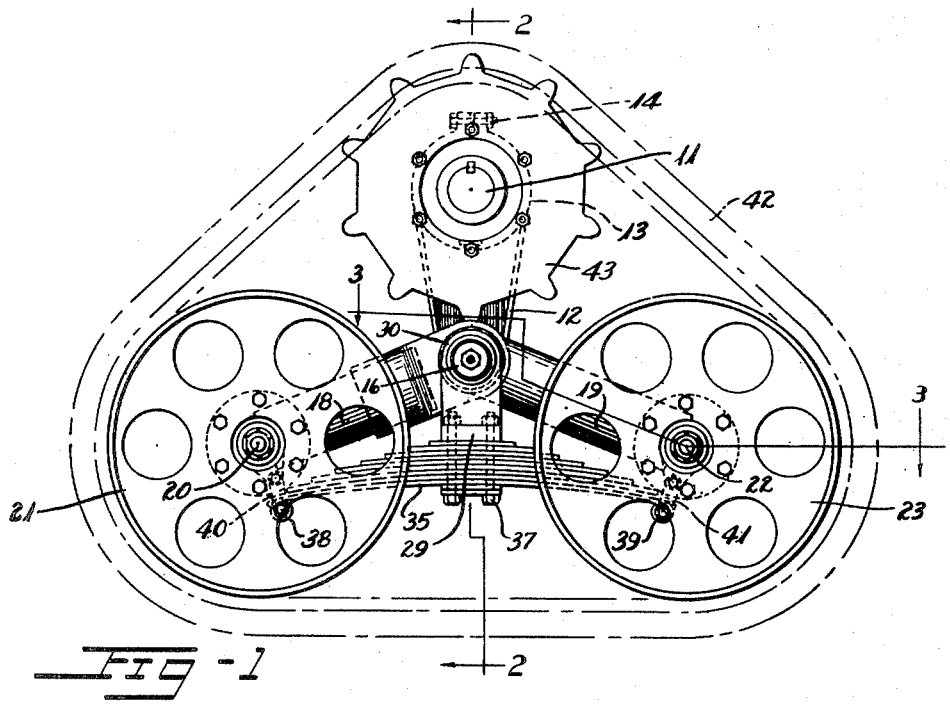
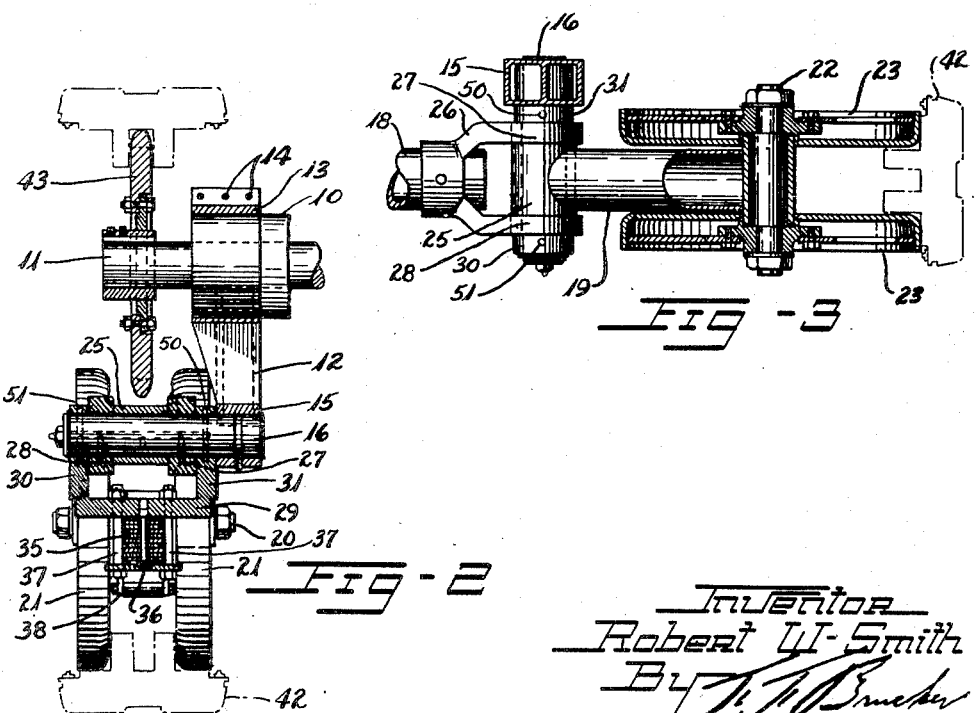

Patented Jan. 31, 1950

2,496,136

UNITED STATES PATENT OFFICE 2,496,136

UNDERCARRIAGE FOR SELF-LAYING TRACK TYPE VEHICLES

Robert W. Smith, Copley, Ohio, assignor to The B. F. Goodrich Company, New York, N. Y., a corporation of New York Application January 2, 1948, Serial No. 184

5 Claims. (Cl. 305—9)

This invention relates to self-laying track type vehicles and is especially useful on farm tractors or other half-track vehicles.

It is an object of the invention to provide improved structure for equalizing the load on the track at front and rear bogie wheels, and to provide this action resiliently. Other objects are to provide pivoting of the undercarriage about an axis below the drive axle of the vehicle and close to a line representing the resultant of tractive effort and rolling resistance, to provide for pivoting both bogie wheels and a spring connected thereto about an axis common to each of them, to provide an undercarriage which may be used with truss-type tracks, and to provide for wheel deflection without unduly tensioning the track.

These and other objects will appear from the following description and the accompanying drawings.

Of the drawings,

Fig. 1 is a side elevation of an undercarriage corresponding to and embodying the invention, the track being represented by dot and dash lines.

Fig. 2 is a vertical cross sectional view thereof, taken on line 2—2 of Fig. 1.

Fig. 3 is a sectional plan view taken on line 3—3 of Fig. 1.

Referring to the drawings, the numeral 10 designates a stationary axle housing of a tractor through which a rotatable axle shaft 11 extends. A bracket 12 is secured to the axle housing, as by a clamp collar 13 and clamp bolts 14. The bracket 12 depends from the housing and has a hub 15 in which is secured a stub shaft 16 parallel to axle shaft 11 and preferably directly below it. The shaft 16 extends laterally outward of the vehicle and pivotally supports a pair of arms 18, 19, each normally extending forwardly and rearwardly respectively and downwardly inclined from the horizontal plane of the shaft 16. The arm 18 has a horizontal axle 20 for rotatably supporting a pair of bogie wheels 21 and arm 19 has a similar horizontal axle 22 for rotatably supporting a pair of bogie wheels 23.

For rotatably supporting the arms 18, 19 independently about the shaft 16 the arm 19 has a bearing 25 fixed thereto and the arm 18 is bifurcated, as at 26 to provide a pair of bearing portions 27, 28, one at each side of the bearing 25.

For resiliently supporting the arms 18, 19 and limiting movement of one with relation to the other, a spring saddle 29 is rotatably suspended from the shaft 16 by bearings 30, 31 fixed thereto and rotatably engaging the shaft at positions adjacent the bearings 27, 28. A leaf spring 35 is secured to the saddle 29 by a dowel 36 and bolts 37. The ends of the spring extend forward and aft and terminate in shackle loops 38, 39 respectively which are pivotally connected to arms 18, 19 respectively by shackle links 40, 41.

For driving the track 42, a sprocket 43 is secured to shaft 11. The track extends in a triangular course about the bogie wheels 21, 23 and the sprocket 43, and is preferably endless and of the truss type having great resistance to deflection under pressure of the soil thereagainst between the bogie wheels although other types of track may be employed.

The shaft 16 is preferably located at a position within the triangular course of the track such that its axis is near a position on the resultant of tractive effort and rolling resistance and also directly below the axis of the sprocket 43 when the tractor is on level ground as this avoids excessive torsional or bending forces on the bracket 12 and provides even pressure at the bogie wheels while reducing tendency of the undercarriage to nose downwardly in soft ground. While the arms 18, 19 are preferably of even length, the arm 18 may be made longer if desired to further lighten the load of the front bogie wheels 21 and thereby further reduce tendency to nose downwardly while also facilitating steering of the vehicle.

As one of the arms 18, 19 is deflected upwardly, due to the floating of the spring 35 about the shaft, the other arm will be urged downwardly by the spring.

If desired, the spring saddle 29 may be fixed to the shaft 16, as by bolting or clamping it thereto, in which case the spring will act upon each arm 18, 19 independently. This modification of the invention may be provided by inserting pins or bolts through holes 50, 51 extending through the bearings 30, 31 and the shaft 16 to lock the saddle 29 to the shaft.

Variations may be made without departing from the scope of the invention as it is defined by the following claims.

I claim:

1. An undercarriage for a self-laying half track type vehicle having an axle shaft, said undercarriage comprising arms pivotally mounted for movement independent of each other on said vehicle at a position below and substantially in vertical alignment with said axle shaft with the vehicle resting on a level surface, one arm extending forwardly and downwardly from its pivotal mounting, the other arm extending rearwardly and downwardly from its pivotal mounting, each arm having a bogie wheel rotatably mounted thereon, a driving wheel on said shaft for driving a track engaged about said bogie wheels and driving wheel, the bogie wheels on said arms and the driving wheel on said shaft comprising a triangularly arranged group constituting the sole contact of the vehicle with the track, and spring means connecting said arms for resiliently modifying movement of one arm upon movement of the other arm said arms and said spring means being pivotally movable as a unit about the pivotal mounting.

2. An undercarriage for a self-laying half track type vehicle having an axle shaft, said undercarriage comprising arms mounted for movement independent of each other on said vehicle about an axis parallel to and below and substantially in vertical alignment with said axle shaft with the vehicle resting on a level surface, one arm extending forwardly of the vehicle and downwardly from the pivotal axis, the other arm extending rearwardly of the vehicle and downwardly from said axis, each arm having a bogie wheel rotatably mounted thereon, a driving wheel on said shaft for driving a track engaged about said driving and bogie wheels, the bogie wheels on said arms and the driving wheel on said shaft comprising a triangularly arranged group constituting the sole contact of the vehicle with the track, and spring means connecting said arms for resiliently modifying movement of one arm upon movement of the other, said spring means being mounted for pivotal movement about said pivotal axis.

3. An undercarriage for a self-laying half track type vehicle having an axle shaft, said undercarriage comprising a horizontal pivot pin mounted parallel to and below the axle shaft of the vehicle substantially in vertical alignment with said shaft, arms pivotally mounted for independent movement about said pivot pin, one arm extending forwardly therefrom and the other extending rearwardly therefrom, and both being inclined downwardly, each arm having a bogie wheel rotatably mounted thereon, a sprocket wheel on said axle shaft for driving a track engaged about said bogie wheels, said bogie wheels and said sprocket comprising the sole means for contact of the vehicle with the track, a spring saddle pivotally mounted on said pivot pin, a leaf spring attached at its midportion to said saddle, and shackle links connecting the ends of said spring respectively to said arms.

4. In a self-laying half track-type vehicle having a fixed axle, an axle shaft extending therethrough, a track-driving sprocket on said axle shaft and a pivot pin mounted below said axle shaft substantially in vertical alignment therewith and parallel thereto, an undercarriage mounted on said pivot pin and comprising arms pivotally mounted on said pin and extending forwardly and rearwardly therefrom, respectively, each arm being inclined downwardly from said pivot pin and having a bogie wheel rotatably mounted thereon remote from said pivot pin, said track-driving sprocket and said bogie wheels constituting the sole means on said vehicle for contacting a track encompassing them, a leaf spring pivotally mounted at its center on said pivot pin independent of said arms, and means respectively connecting the ends of said spring to said arms for resiliently transmitting forces from one arm to the other.

5. In a self-laying half track-type vehicle having a fixed axle, an axle shaft extending therethrough, a track-driving sprocket on said axle shaft and a pivot pin mounted below said axle shaft substantially in vertical alignment therewith and parallel thereto, an undercarriage mounted on said pivot pin and comprising arms pivotally mounted on said pin and extending forwardly and rearwardly therefrom respectively, each arm being inclined downwardly from said pivot pin and having a bogie wheel rotatably mounted thereon remote from said pivot pin, said track-driving sprocket and said bogie wheels constituting the sole means on said vehicle for contacting a track encompassing them, a leaf spring pivotally mounted at its center on said pivot pin independent of said arms, means respectively connecting the ends of said springs to said arms for resiliently transmitting forces from one arm to the other, one of said arms being of greater length than the other to reduce the load on the front bogie wheel relative to the load on the rear bogie wheel.

ROBERT W. SMITH.

REFERENCES CITED

The following references are of record in the file of this patent:

UNITED STATES PATENTS

| Number | Name | Date |
|---|---|---|
| 1,292,286 | Faust | Jan. 21, 1919 |
| 2,162,198 | Herrington | June 13, 1939 |
| 2,355,456 | Macbeth | Aug. 8, 1944 |

FOREIGN PATENTS

| Number | Country | Date |
|---|---|---|
| 409,225 | Great Britain | Apr. 26, 1934 |

Certificate of Correction

Patent No. 2,496,136 January 31, 1950

ROBERT W. SMITH

It is hereby certified that error appears in the printed specification of the above numbered patent requiring correction as follows:

Column 4, line 35, for the word "springs" read *spring*;

and that the said Letters Patent should be read with this correction therein that the same may conform to the record of the case in the Patent Office.

Signed and sealed this 18th day of July, A. D. 1950.

[SEAL]

JOE E. DANIELS,
*Assistant Commissioner of Patents.*